United States Patent [19]

Saxe

[11] Patent Number: 5,325,220
[45] Date of Patent: Jun. 28, 1994

[54] LIGHT VALVE WITH LOW EMISSIVITY COATING AS ELECTRODE

[75] Inventor: Robert L. Saxe, New York, N.Y.

[73] Assignee: Research Frontiers Incorporated, Woodbury, N.Y.

[21] Appl. No.: 28,404

[22] Filed: Mar. 9, 1993

[51] Int. Cl.$^5$ .............................................. G02F 1/13
[52] U.S. Cl. ........................................ 359/87; 359/245
[58] Field of Search ........................ 359/87, 228, 245

[56] References Cited

U.S. PATENT DOCUMENTS

| | | | |
|---|---|---|---|
| 4,114,991 | 9/1978 | Bleha, Jr. et al. | 359/87 X |
| 4,432,610 | 2/1984 | Kobayashi et al. | 359/87 X |
| 5,148,298 | 9/1992 | Shigeta et al. | 359/87 X |

*Primary Examiner*—Mark Hellner
*Attorney, Agent, or Firm*—Rosenman & Colin

[57] ABSTRACT

A light valve has opposed, spaced apart cell walls, each cell wall carrying an electrode thereon for application of an electrical field to the light valve, at least one of the electrodes comprising a low-emissivity, electrically conductive material.

7 Claims, No Drawings

LIGHT VALVE WITH LOW EMISSIVITY COATING AS ELECTRODE

FIELD OF INVENTION

The present invention relates to light valves, and more particularly to light valves having electrodes comprising a low-emissivity, electrically conducting material. As discussed hereinafter, the term "low-emissivity electrically conducting material" as used in the specification and claims herein does not include indium tin oxide.

BACKGROUND

Light valves have been used for more than fifty eight years for modulation of light. A light valve may be described as a cell formed of two walls that are spaced apart by a small distance, at least one wall being transparent, the walls having electrodes thereon usually in the form of transparent, electrically conductive coatings. Between the cell walls of the cell is a "light valve suspension", which may be a liquid having a plurality of small particles suspended therein. See, for example, U.S. Pat. No. 4,407,565. Alternatively, the "light valve suspension" may be in the form of a film having droplets of a liquid light valve suspension distributed in the film, the liquid light valve suspension comprising a plurality of small particles suspended in a liquid suspending medium. See, for example, U.S. Pat. No. 4,919,521. In such cases, the film is located between the opposed cell walls.

In the absence of an applied electrical field, the particles in the light valve suspension exhibit random Brownian movement, and hence a beam of light passing into the cell is reflected, transmitted or absorbed, depending upon the nature and concentration of the particles and the energy content of the light. When an electric field is applied through the light valve suspension in the light valve, the particles become aligned and for many suspensions most of the light can pass through the cell.

Light valves have been proposed for many purposes including, e.g., alphanumeric displays, television displays, windows, mirrors, filters, ski goggles, eyeglasses and the like to control the amount of light passing therethrough.

THE LIGHT VALVE SUSPENSION

The light valve suspension used in the present invention comprises a liquid suspending medium in which a plurality of small particles is dispersed. As is known, inorganic and organic particles may be used in a light valve suspension, such as mica, metals, graphite, metal halides, polyhalides (sometimes referred to in the prior art as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). If a polyhalide of an alkaloid acid salt is used, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light-absorbing or light-reflecting.

Also, the particles may be particles of a hydrogenated polyhalide of a quinine alkaloid acid salt, such as dihydrocinchonidine sulfate polyiodide, as described in U.S. Pat. No. 4,131,334, or a light-polarizing metal halide or polyhalide, such as cupric bromide or purpureocobalt-chloride sulfate polyiodide, as, e.g., in U.S. Pat. No. 1,956,867. Preferably, the particles are light-polarizing polyhalide particles such as those described in U.S. Pat. Nos. 4,877,313 and 5,002,701, which are more environmentally stable than prior art polyhalides.

In theory, any type of particles capable of reflecting, absorbing and/or transmitting desired wavelengths of visible light can be used in the light valve suspension.

The shape of the particles used in the light valve suspension should preferably be "anisometric", i.e. the shape or structure of the particle is such that in one orientation the particle intercepts more light than in an another orientation. Particles which are needle-shaped, rod-shaped, lath-shaped, or in the form of thin flakes, are suitable.

The particles are preferably of colloidal size, that is the particles will have a large dimension averaging about 1 micron or less. It is preferred that most particles have large dimensions less than one-half of the wavelength of blue light, i.e., 2000 Angstroms or less, to keep light scatter extremely low.

Any type of particle which when in suspension is orientable in an electric or magnetic field is usable, including both light-scattering and light-absorbing particles. However, particles that absorb visible light that impinges on them are preferred because they exhibit very little light scatter. Light-polarizing particles are especially preferred and useful because they produce a pleasing visual appearance.

Light-absorbing particles comprise many types of material including colored orientable pigments and dyes, e.g. garnet red, conductive black or grey material such as graphite or carbon black, dichroic dyes such as are widely used in guest-host liquid crystal devices, light-polarizing materials, e.g., cupric bromide, and polyhalides, and especially polyiodides, e.g., those described in conjunction with prior art light valve devices.

The term "polyiodide" as used herein is used in the conventional sense and also in the same sense as the term "periodide" is used in numerous prior art light valve patents, e.g., see column 1 of U.S. Pat. No. 1,951,664, to indicate a material which is a reaction product of a precursor compound, which may be a sulfate (or certain other salts as described in U.S. Pat. No. 4,270,841) of heterocyclic nitrogenous bases with iodine and an iodide. Such reaction products are often called polyiodide compounds. This type of particle is discussed in detail in "The Optical Properties and Structure of Polyiodides" by D. A. Godina and G. P. Faerman published in The Journal of General Chemistry, U.S.S.R. Vol. 20, pp. 1005–1016, (1950). Herapathite, for example, is quinine bisulfate polyiodide, and its formula is given under the heading "quinine iodosulfate" as $4C_{20}H_{24}N_2O_2SO_4.3H_2SO_4.2HI.I_4.6H_2O$ in The Merck Index, 10th Ed. (Merck & Co., Inc., Rahway, N.J.). In more modern, preferred types of polyiodides, the precursor compound need not be a salt, e.g., see U.S. Pat. Nos. 4,877,313 and 5,002,701. In these polyiodide compounds the iodine is thought to form chains and the compounds are strong light polarizers. The term "polyhalide" is used herein to mean a compound such as a polyiodide, but wherein at least some of the iodine in the iodide is replaced by another halogen element.

The light valve suspension of the present invention may include any of the liquid suspending media previously proposed for use in light valves for suspending the particles. In general, the liquid suspending medium may comprise one or more electrically resistive, chemically inert liquids that will both suspend the particles and dissolve any polymeric stabilizer used to reduce the tendency of the particles to agglomerate and thus keep the particles in suspension. Liquid suspending media that are known in the art are useful herein, such as the liquid suspending media disclosed in U.S. Pat. No. 4,247,175. In general one or both of the liquid suspending medium or the polymeric stabilizer dissolved therein is chosen so as to maintain the suspended particles in gravitational equilibrium.

A light valve suspension useful in the present invention is described in U.S. Pat. No. 4,407,565 and is based upon the use as the liquid suspending medium of an electrically resistive, chemically inert, low molecular weight liquid fluorocarbon polymer having a specific gravity at room temperature of at least about 1.5 and having at least about 50% of its atoms constituted by halogen atoms, at least 60% of the halogen atoms being fluorine and the balance chlorine and/or bromine. Other types of suspensions which do not incorporate such halogenated liquids can also be used and can maintain the particles in gravitational equilibrium if a sufficient quantity of stabilizing polymer is employed therein.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For example, the particles can be coated with a first type of solid polymeric stabilizer such as nitrocellulose, which in effect, provides a plain surface coating for the particles and one or more additional types of a solid polymeric stabilizer that bond to or associate with the first type of solid polymeric stabilizer and also dissolve in the liquid suspending medium to provide dispersion and steric protection for the particles.

Preferably, to keep the particles in suspension, the liquid suspending medium may also comprise as the solid polymeric stabilizer an A-B type block polymer as disclosed in European Patent Publication 350,354. Nitrocellulose and/or other solid polymeric stabilizers may also be usefully provided in the liquid suspending medium in addition to the block polymer. It is preferred to use just enough A-B block polymer to maintain the particles in suspension, the amount to be used for a given light valve suspension being empirically determined, as is known. Usually, the amount of solid polymeric stabilizer will be from about 1% to about 30%, such as from 5% to about 25%, by weight, based on the total weight of the light valve liquid suspension. However, while the use of a solid polymeric stabilizer is preferred, it need not be used in all cases.

The copending applications of Joseph A. Check, III, Ser. Nos. 972,826 and 972,830, both filed Nov. 6, 1992, are incorporated herein by reference thereto. These applications disclose presently preferred light valve suspensions in the form of liquids and films.

THE ELECTRODES

The cell walls of a light valve have electrodes thereon. In some cases, e.g., for a mirror or a reflective display, the electrode which comprises the rear wall of the light valve or is deposited on the inside rear wall may be opaque and reflective, e.g., a metal film. In light valves used or intended for use as a window, a filter or as eyewear, however, the electrodes comprise transparent electrically conductive coatings and are deposited on the inside of both the front and back cell walls of the light valve. Such transparent electrodes may comprise either transparent or partially transparent metal coatings, such as gold or platinum, or may comprise coatings of metal oxides, such as tin oxide or indium tin oxide or any other transparent, electrically conductive material.

If the electrodes are in direct contact with the light valve suspension, then the light valve may be referred to as an ohmic light valve. However, if the electrodes carry a nonconductive or dielectric overcoating that is in contact with the light valve suspension, then the light valve may be referred to as a capacitive light valve. Heretofore, light valves of both the ohmic and capacitive types have been known.

The "emissivity" of a surface is the ratio of the radiation emitted by that surface to the radiation emitted by a perfect blackbody radiator at the same temperature. A "low emissivity" material will thus reflect much of the impinging heat energy impinging on it and will absorb and hence radiate only a small amount of the heat energy. Polished silver, for example, has an emissivity of only 0.02, and is thus an excellent reflector of heat energy.

For certain applications, especially windows, it is important that the light valve not only be able to regulate and control the amount of visible light, but also to reflect infrared radiation. Thus, since infrared radiation accounts for a high percentage of the heat impinging on a building or vehicle, if one could reflect the infrared radiation efficiently one could reduce the amount of air conditioning in the summer. Moreover, if the heat within the building could be reflected back into the building, one could also reduce the amount of heating in the winter.

Glass sheets used in the flat panel display industry, e.g., substrates for liquid crystal displays, generally have electrodes made of indium tin oxide. Such electrodes can reflect some but not a substantial amount of "far" infrared radiation, and they can reflect only a small amount of "near" infrared radiation. They are not low-emissivity electrodes and therefore they are not useful in reflecting heat-causing infrared radiation in general Accordingly, the "low-emissivity electrically conducting material" as used in the specification and claims herein does not include indium tin oxide. (The term "far" infrared radiation means radiation of a wavelength of from above about 2.5 microns to about 300 microns, while the term "near" infrared radiation means radiation of a wavelength of from about 0.7 to about 2.5 microns.)

The flat glass industry in recent years has begun widespread sale of so-called low-emissivity or low-E glass (sometimes referred to as glass having a low-E coating), in which the glass has a special low-emissivity coating thereon, generally on one surface of the glass sheet. The special coating may consist of a single layer of low emissivity material or may be a multilayer low emissivity coating. In any case, however, the purpose of the low-E glass is to enable a window to reflect heat more efficiently than glass alone could do.

As is known, tin oxide coatings may be rendered conductive so that the coating reduces the emissivity of the coated glass in respect of far infrared radiation, such as radiation having wavelengths greater than 3 microns. Thus, one type of low-E glass available from the Glass Division of the Ford Motor Company, Detroit, Mich., consists of a sheet of glass with a layer of fluorine-doped tin oxide on one side. See also, U.S. Pat. No. 4,900,634, which describes flat glass bearing a pyrolytic tin oxide coating comprising fluorine and a second dopant. These types of low-E glass are useful in the present invention to provide a cell wall of a light valve having a low-emissivity electrode on the cell wall.

A second well-known type of low-E coating comprises a laminate of a metal layer and a dielectric. This multilayer laminate provides a low-E coating that is able to reflect a substantial amount of near infrared radiation. See U.S Pat. Nos 2,519,722, 3,885,855, 4,799,745 and 5,183,700. Low-E coatings of this type generally use a multilayer laminate of n layers of a transparent metal, metal alloy or metal oxide, such as silver, silver-gold alloy, copper, zinc sulfide, zinc oxide, tin oxide, tantalum oxide and the like, and $n+1$ or $n+2$ layers of a transparent dielectric, such as titanium dioxide, silicon dioxide, magnesium fluoride, thorium fluoride and the like. While a three-layer low-E laminate of dielectric-metal-dielectric is useful, it is presently preferred to use a five-layer low-E laminate of dielectric-metal-dielectric-metal-dielectric as the electrode of a light valve.

Many other types of low-E coatings are known in the art and are within the scope of the present invention to provide the electrode of a light valve.

An article that was published in the February, 1992 issue of *Glass Industry* explained some of the advantages of low-E glass, namely:

(1) Low-E glass reduces heat losses from the interior of a building during the season when heating is necessary, but also lessens the inward movement of heat during the cooling season by reflecting part of the infrared heat back towards its source;

(2) The metal or metal oxide in a low-E coating can reflect more than 70 percent of long wavelength infrared heat back towards its source, whereas uncoated glass reflects only 16 percent of long wavelength infrared; and (3) Use of low-E glass together with efficient tinted glass can reduce the amount of solar heat gain by more than one third.

While low-E glass is clearly superior in reflecting infrared radiation as compared to either glass alone or glass coated with either tin oxide or indium tin oxide, low-E glass having a single layer of low-emissivity, doped tin oxide will primarily reflect "far" infrared radiation but will not efficiently reflect "near" infrared radiation. As stated above, the multilayer low-E coating of the general type designated as dielectric/metal/dielectric/metal/dielectric does reflect "near" radiation and is hence preferred. It may consist of two silver layers separated by and sandwiched between three dielectric layers, and is commercially available from Cardinal I.G. of Minnetonka, Minn.

A listing of manufacturers of low-emissivity glass may be found on page 152 of the 1992 *Glass Industry* Directory Issue, published by *Glass Industry*, P.O. Box 7636, Riverton, N.J.

While glass is the usual substrate for a low-E coating, it is possible for many low-E coatings to be deposited on a plastic substrate. See, for example, U.S. Pat. No. 5,183,700 entitled "Solar Control Properties in Low-Emissivity Coatings".

SUMMARY

The present invention now provides a light valve having opposed, spaced apart cell walls, each cell wall carrying an electrode thereon for application of an electrical field to the light valve, at least one of the electrodes comprising a low-emissivity, electrically conductive material. It is presently preferred that a cell wall carrying the low-emissivity, electrically conducting material will be capable of reflecting at least twice the amount of far infrared radiation as compared to same cell wall without the low-emissivity, electrically conducting material.

A major advantage of using a low-E coating as one or both of the electrodes of the light valve is that one can obtain the benefit of substantive infrared heat reflection from the light valve electrode itself.

A second important advantage is that low-E coated glass is generally very much less costly than glass coated with indium tin oxide or tin oxide. This is because low-E coatings are often applied to glass during the manufacturing of the glass itself, or are applied to very large volumes of glass, whereas glass coated with indium tin oxide or tin oxide is usually coated in a relatively expensive batch process. Hence, the use of sheets of low-E coated glass as the cell walls of a light valve is very economical.

EXAMPLE 1

A light valve is prepared using cell walls that are low-E glass sheets having a layer of fluorine-doped tin oxide as the electrodes. The gap between the electrodes is 5 mils. A liquid suspension of dihydrocinchonidine sulfate polyiodide ("DCSI") made according to the method set forth in U.S. Pat. No. 4,131,334 is filled between the electrodes. Upon application of 150 volts RMS to the electrodes, the light valve becomes very transparent, just as one would observe using standard light valve electrodes.

EXAMPLE 2

Example 1 is repeated using a liquid suspension of particles of pyrazine 2,5-dicarboxylic acid calcium iodide polyiodide described in U.S. Pat. No. 5,002,701. Upon application of a voltage of 150 volts RMS the light valve becomes very transparent, just as one would observe using standard light valve electrodes.

EXAMPLE 3-4

Examples 1 and 2 are repeated using cell walls made of low-E coated glass having low-E coatings of dielectric-silver metal-dielectric-silver metal-dielectric, with similar results.

EXAMPLE 5

Example 1 is repeated but using transparent plastic sheets having electrodes in the form of fluorine-doped tin oxide coated on the plastic sheets. The results are the same.

EXAMPLE 6

Example 1 is repeated but using transparent sheets of a laminate of plastic and glass having electrodes in the form of fluorine-doped tin oxide coated on either side of the sheets. The results are the same.

I claim:

1. A light valve, comprising a pair of opposed, spaced apart cell walls, a light valve suspension between said cell walls, said suspension comprising particles suspended in a liquid suspending medium, an electrode on each of said cell walls for applying an electrical field to said light valve suspension, at least one of said electrodes comprising a low-emissivity, electrically conducting material.

2. The light valve according to claim 1, wherein both of said electrodes comprises a low-emissivity, electrically conducting material.

3. The light valve according to claim 1 wherein the low-emissivity material is a fluorine-doped tin oxide, a laminate of dielectric-metal-dielectric or a laminate of dielectric-metal-dielectric-metal-dielectric.

4. The light valve according to claim 1, wherein the cell walls are made of glass, plastic or a glass-plastic laminate.

5. The light valve according to claim 1, in the form of a window, the electrodes and the cell walls being transparent.

6. The light valve according to claim 1, wherein said low-emissivity electrically conducting material is capable of reflecting at least twice the amount of far infrared radiation as compared to the same cell wall without the low-emissivity electrically conducting material.

7. The light valve according to claim 2, wherein said low-emissivity electrically conducting material is capable of reflecting at least twice the amount of far infrared radiation as compared to the same cell wall without the low-emissivity electrically conducting material.

* * * * *